United States Patent

Davenport et al.

[11] Patent Number: 5,560,699
[45] Date of Patent: Oct. 1, 1996

[54] OPTICAL COUPLING ARRANGEMENT BETWEEN A LAMP AND A LIGHT GUIDE

[75] Inventors: John M. Davenport, Lyndhurst; Richard L. Hansler, Pepper Pike; William J. Cassarly, Richmond Heights, all of Ohio; Mahendra S. Dassanayake, Farmington Hills, Mich.; Jeffrey A. Erion, Plymouth, Mich.; John X. Li, Farmington Hills, Mich.

[73] Assignees: General Electric Company, Schenectady, N.Y.; Ford Motor Company, Dearborn, Mich.

[21] Appl. No.: 116,146

[22] Filed: Sep. 2, 1993

[51] Int. Cl.⁶ .................. F21V 8/00; F21V 7/08
[52] U.S. Cl. .................. 362/32; 362/298; 362/346
[58] Field of Search .................. 362/300, 32, 298, 362/299, 322, 26, 346, 297, 310, 347, 350, 61; 385/47, 201

[56] References Cited

U.S. PATENT DOCUMENTS

| 4,002,499 | 1/1977 | Winston . | |
|---|---|---|---|
| 4,460,939 | 7/1984 | Murakami et al. | 362/32 X |
| 4,735,495 | 4/1988 | Henkes | 362/32 X |
| 4,950,059 | 8/1990 | Roberts | 362/32 X |
| 4,956,759 | 9/1990 | Goldenberg et al. | 362/297 |
| 4,958,263 | 9/1990 | Davenport | 362/32 |
| 5,147,128 | 9/1992 | Windross | 362/32 |
| 5,178,446 | 1/1993 | Gruber et al. | 362/802 X |
| 5,239,230 | 8/1993 | Mathews et al. | 313/571 |
| 5,271,077 | 12/1993 | Brockman et al. | 362/32 X |
| 5,321,586 | 6/1994 | Hege et al. | 362/62 X |

FOREIGN PATENT DOCUMENTS

| 1383413 | 11/1964 | France . | |
|---|---|---|---|
| 2509112 | 10/1975 | Germany | 385/47 |

Primary Examiner—Denise L. Gromada
Assistant Examiner—Thomas M. Sember
Attorney, Agent, or Firm—George E. Hawranko; Stanley C. Corwin

[57] ABSTRACT

A central lighting system for providing light to locations remote from the light source includes first and second ellipsoidally shaped reflector members joined so as to substantially surround the light source. The reflector members collect the light output and focus it onto an input face of either a light guide or a non-imaging optical coupling member. If the optical coupling member is utilized, an angle to area conversion occurs so as to allow light introduced at high angles to an input face of the optical coupler to exit the optical coupler at a smaller angle. The reflector members can also be configured so that respective second optical focal points can reside at the apex of the opposing reflector member thereby allowing for a coupling efficiency of approximately 70% or greater.

2 Claims, 5 Drawing Sheets

OPTICAL COUPLING ARRANGEMENT BETWEEN A LAMP AND A LIGHT GUIDE

CROSS-REFERENCE TO A RELATED APPLICATION

The present application is related to U.S. Patent Application serial number (to be assigned) entitled "Light Guide Termination Arrangement For Producing A Convergent Beam Output" (attorney docket LD 10,323) filed even-date herewith, assigned to the same assignee as the present invention and herein incorporated by reference.

FIELD OF THE INVENTION

The present invention relates to an improved optical coupling arrangement between a lamp and a light guide. More particularly, the present invention relates to such an improved optical coupling arrangement which provides for a high efficiency light collecting configuration disposed in relation to a high brightness light source thereby providing for a larger amount of light output being available at the output of a light guide.

BACKGROUND OF THE INVENTION

Significant design efforts have been directed lately to the task of providing a centralized lighting system whereby a single source of high intensity light could be utilized for the illumination of a number of separate remote locations requiring specific levels of light. Such efforts have led to proposals of central lighting systems for areas such as automotive lighting, display lighting for merchandise for instance and for home use. An example of such a central lighting system applicable in the automotive field can be found in U.S. Pat. No. 4,958,263 issued to Davenport et al. on Sep. 18, 1990 and assigned to the same assignee as the present invention. The goal of this automotive lighting system as well as any central lighting system is to achieve the most efficient light coupling between the light source and the light distribution arrangement and then, the most efficient delivery of the light output from the light distribution arrangement which is typically an optical fiber, light guide or equivalent. One example of an attempt to maximize light delivery at a particular point can be found in French Patent No. 1,383,413 issued to Karl Storz for a device for illuminating operating fields. This invention uses a pair of spaced apart reflectors on either side of an incandescent light source to collect light in a more efficient manner for use during surgical procedures. For an automotive application or any situation where space considerations are of significant importance in the design of a centralized lighting system, it would be advantageous to utilize components such as light guides, coupling elements and the actual light source which are of such a reduced size so as to allow for reduced space requirements thereby proving advantageous for an aerodynamically tapered appearance of the front end of the vehicle. Specifically, for a central lighting system to be acceptable from an economical point of view, the size of the light guide should be on the order of 6 mm or less in diameter to allow for the maximum system design flexibility. In an automotive application, present designs require a light guide with a diameter of approximately 10 mm in order to provide a sufficient amount of light output for a headlamp type of application. Known techniques allow for an intensity level of approximately 10 lumens per square millimeter which, using a 10 mm light guide, would result in approximately 785 lumens available for delivery to the road surface. Though this is an acceptable amount of light output, it is achieved using a light guide which is large, of a comparatively significant weight and lacking in flexibility relative to a light guide having a diameter of 6 mm or less. It would therefore be advantageous to provide a light coupling arrangement which could achieve a higher energy density so as to allow for a smaller diameter light guide.

The advantage of using a reduced diameter light guide can be appreciated when one considers that such small diameter light guide provides a higher lumen density measured in terms of lumens per unit of cross-sectional area of the light guide. In order to provide the most efficient light delivery system, substantially all of the light from the image of a high brightness light source must be introduced to the input face of the light guide. For the present invention, a light source having a flux measurement in excess of 4000 lumens delivered from a discharge lamp having an arc gap of less than 4 mm was utilized, such light source being available from General Electric Lighting in the form of the Model LE60, Light Engine™ high brightness light source. To achieve the desired efficiency using a smaller diameter light guide would require that the magnification of the image formed by a reflector associated with the light collection arrangement be reduced, preferably to unit magnification. It is known in the prior art that unit magnification of the light source can be achieved by using a spherical reflector in place of an elliptical one. U.S. Pat. No. 4,956,759 issued to Goldenberg et al on Sep. 11, 1990 describes an illumination system that utilizes a spherical reflector to form a unit magnification image. In such a system, the light source is positioned near the center of curvature of the reflector and an image of unit magnification is formed at a point near the source.

It can be further appreciated that for an automotive application, particularly the forward lighting requirements, it would be advantageous to provide a central lighting arrangement that could provide for illumination of both sides of a vehicle from a single light source. It would also be advantageous if such single light source, dual light output arrangement could be achieved with the highest coupling efficiency possible, for instance, an efficiency in excess of approximately 60 to 70 percent of the available lumen output of the light source. Using known light coupling techniques involving a central light source and an array of light guides typically yields a coupling efficiency on the order of approximately 40 percent. Therefore, by more efficiently coupling a larger percentage of the light source through the light guides, more light available for other purposes such as rear lighting of a vehicle, as well as other interior vehicle lighting. Of course, such light coupling efficiency would also provide a significant advantage to other application areas such as display lighting for merchandising for example.

It is a further requirement of such a central lighting system that light collected from the light source by the associated reflector arrangement provide the light input to the light guide at a small enough angle so as to provide for sufficient light capture at the input face of the light guide. In other words, in order to utilize a light guide having a numerical aperture (NA) value of 0.5, it is necessary to introduce the light to the input face of the light guide at an angle of approximately 30 degrees or less. In a typical light collection arrangement using a nearly hemispherical ellipsoidal reflector, the angle of entry of the light to the input face is on the order of greater than 50 degrees. Although it would be possible to utilize an optical fiber having a larger numerical aperture so as to allow for a larger input angle entry of light, such an optical fiber is more costly and less able to accommodate bending as may be needed in an automotive forward lighting application for instance. Accordingly, it would be a benefit to a new central lighting system if a means could be provided that would reduce the angle of entry so as to allow for a more efficient capture of light at the input face of the light guide having a 0.5 NA or smaller and to provide more efficient transfer to the output end.

SUMMARY OF THE INVENTION

A central lighting system having a high brightness light source and light collection and coupling arrangement associated therewith provides that a single light source can deliver a significant portion of its light output to more than one output port for transmission to a plurality of locations remote from the central light source. This central lighting system provides the collection and coupling arrangement in such a manner to achieve a light coupling efficiency greater than about 60 to 70 percent and collects the light from large angles without experiencing significant losses by reducing such large angles to smaller angles so as to allow coupling to light guides or optical fiber having a numerical aperture rating of about 0.5.

In accordance with the principles of the present invention, there is provided a central lighting system for providing light output to a plurality of remote locations which includes a high brightness light source disposed within a first and second reflector member arranged in a manner to collectively surround at least a substantial portion of the light source. The first and second reflector members are essentially ellipsoidal in shape having respective first focal points which are coincident and wherein for one embodiment of the invention, the reflector members are configured having a base to height ratio that results in each reflector having a second optical focal point which resides at the surface of its opposing counterpart reflector. The central lighting system can also include a non-imaging optical coupling member which has an associated input face which is disposed at either one of the respective second optical focal points of the first and second reflector members. At least one light guide or other light transmission medium is optically coupled to the output face of the optical coupling member and thereafter extends to the necessary remote location for delivery of the light output.

In an important variation of the principle embodiment of this invention, it is possible to use a compound parabolic configuration for the optical coupling member so that light that may be introduced to the input face at large angles can De converted to smaller angles at the output face for a more efficient coupling to occur at the optical connection to the light guides prior to transmission to the remote location.

BRIEF DESCRIPTION OF THE DRAWINGS

In the following detailed description of the invention, reference will be made to the attached drawings in which.

DETAILED DESCRIPTION OF THE INVENTION

Figure 1:
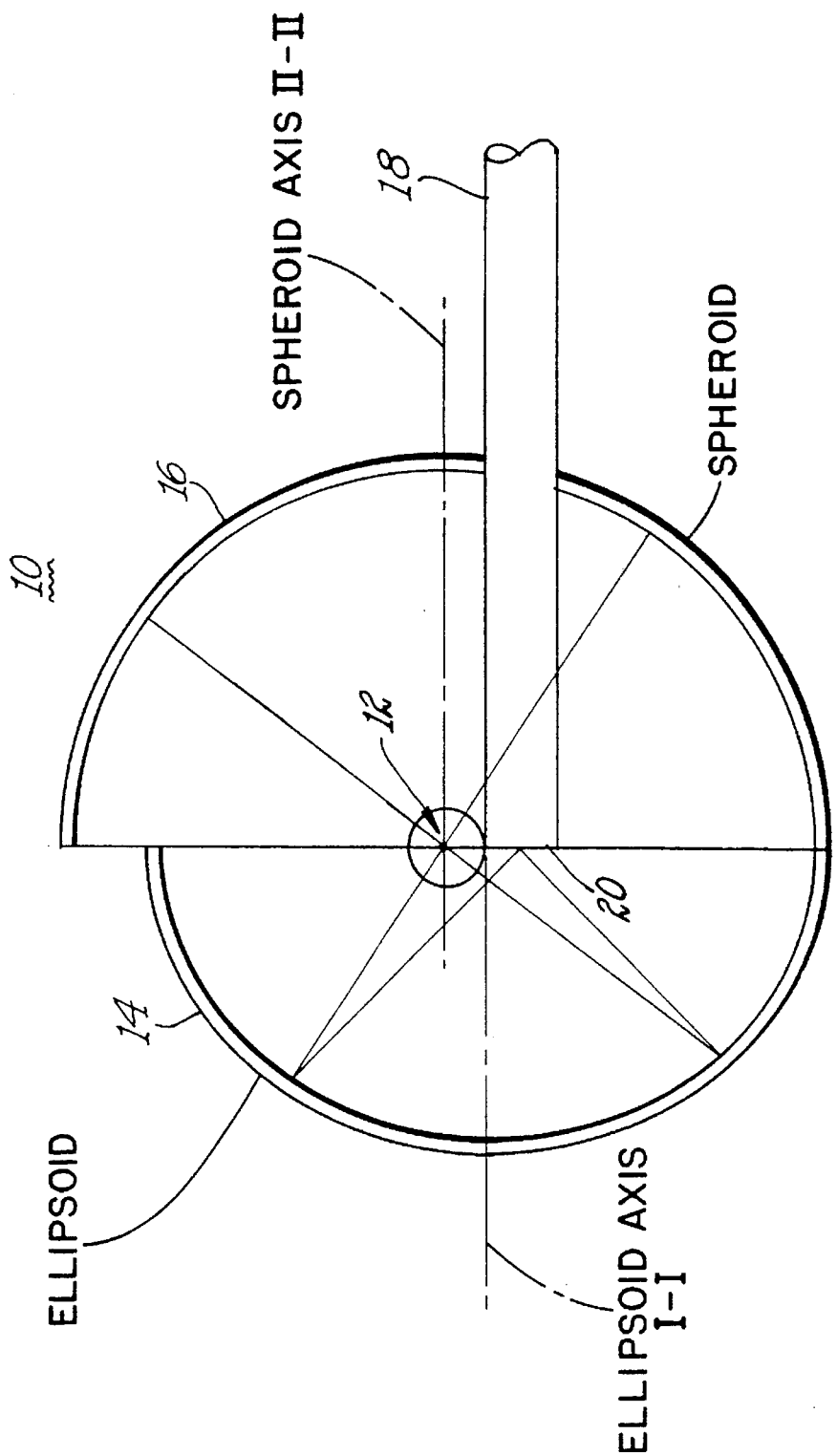
FIG. 1 is an elevational view in section of a central lighting system having a single output port and which is constructed in accordance with the principles of the present invention.

As seen in FIG. 1, a central lighting system 10 for providing light output to at least one location remote from the actual light source 12, includes a first reflector member 14 disposed in adjacent relation to a second reflector member 16 so as to substantially surround the light source 12. The light source 12 for such a central lighting system 10 can be provided by way of a Light Engine™ light source Model LE60 available from GE Lighting, This light source 12 is capable of providing a light output in the range of greater than 4000 lumens from an arc gap of approximately 2.5 mm and is described in pending application serial number 07/858,986 entitled "High Brightness Discharge Light Source" filed Mar. 27, 1992 in the name of Mathews et al. and assigned to the same assignee as the present invention. It should be understood however that though a high brightness discharge light source is preferred, it is possible to utilize a high brightness incandescent light source in the present arrangement and achieve the significant efficiency in light coupling offered by the present invention.

As indicated in FIG. 1, the first reflector 14 is configured in the shape of an ellipsoid which is essentially hemispherical whereas the second reflector member is configured in the form of a spheroid. The respective axii of the ellipsoidal first reflector 14 and the spheroidal second reflector 16 are also identified in FIG. 1 by way of dashed lines I—I and II—II which are offset from one another with the light source 12 residing on the spheroidal axis of the second reflector 16. In terms of relative size between the first reflector 14 and the second reflector 16, it can be seen that the second reflector 16 is larger and that when the first and second reflectors are joined so as to substantially surround the light source 12, an essentially clam-shaped configuration results.

By this clam-shaped configuration, the second reflector 16 is effective for forming an image of the light source 12 back on itself thus effectively doubling the amount of light entering the input face 20 of an optical light guide 18 disposed within the clam-shaped configuration of the joined first and second reflector members 14 and 16. This is possible since the arc is essentially transparent to its own radiation. If the light collection and coupling arrangement of FIG. 1 is utilized with an incandescent light source as an alternative, the filament would appear nearly opaque thereby requiring that the spherical second reflector 16 be moved slightly so that the image would lie next to the actual filament and both would be imaged onto the input face 20 of the optical light guide in a similar manner to that achieved when using a discharge type of light source.

Figure 2:
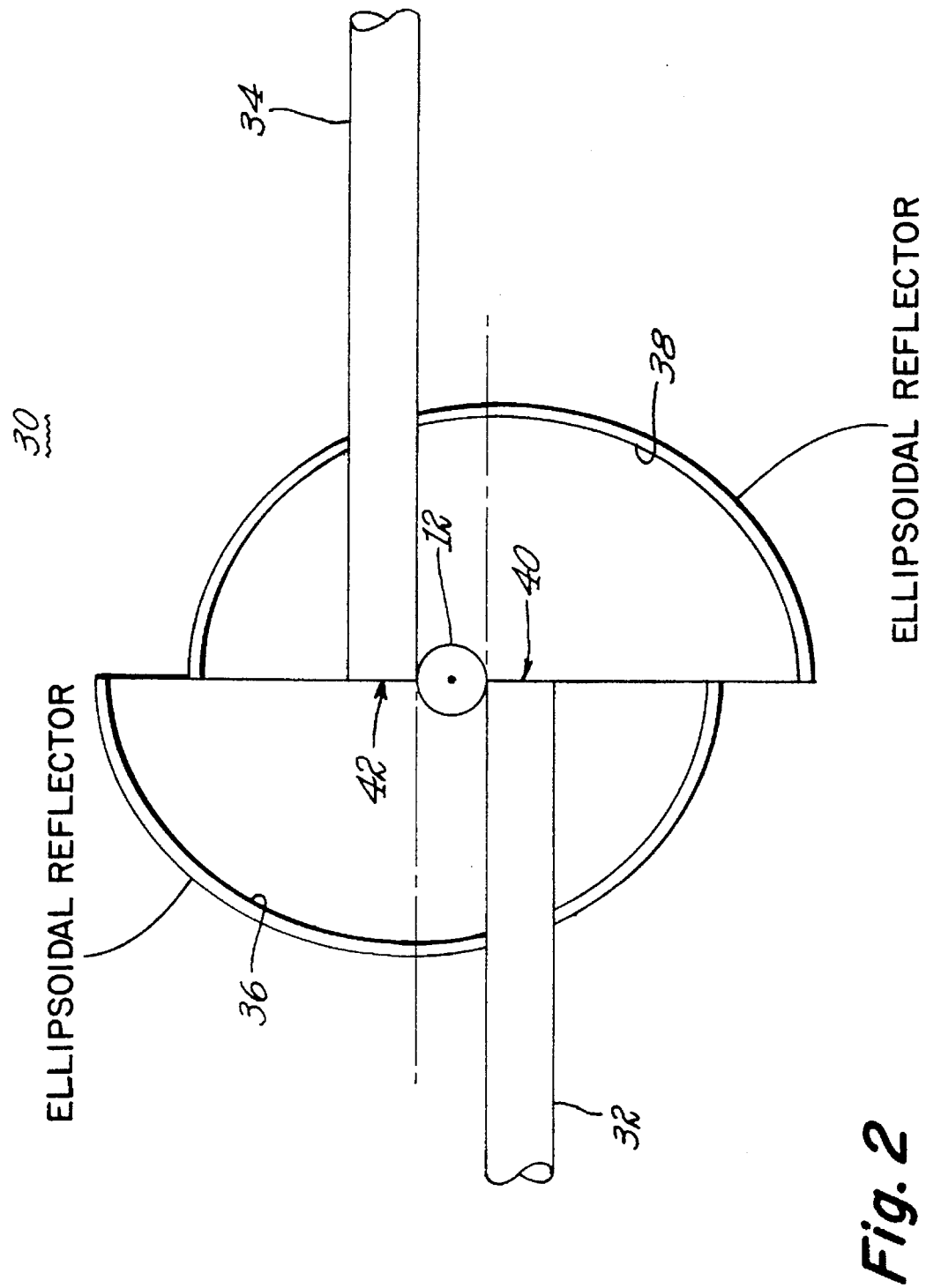
FIG. 2 is an elevationai view in section of a central lighting system having a dual light output arrangement and constructed in accordance with an alternate embodiment of the invention.

As shown in FIG. 2, an alternate arrangement for providing a central light system 30 having an efficient coupling arrangement between the light source 12 and more than one optical light guide 32, 34 utilizes a pair of ellipsoidal reflectors each having approximately unit magnification ratios and being joined in an essentially offset manner such that the respective ellipsoidal axii are offset a sufficient distance as to allow the light source 12 to be disposed therebetween. The ellipsoidal reflectors 36, 38 shown in FIG. 2 are off-axis ellipsoids; that is, the axis of each ellipsoidal reflector 36, 38 is vertically disposed as seen in this figure. Of course it is also possible to use hemispherically shaped reflectors for this application. As can be further seen in FIG. 2, the two optical light guides, 32 and 34 are disposed within the joined configuration of the first and second reflector members 36, 38 so that their respective input faces 40, 42 are disposed along the transverse axis at which the reflector members 36 and 38 are joined and further wherein the longitudinal axii of the two optical light guides 32, 34 are disposed in a parallel but offset manner relative to the ellipsoidal axii of the reflector members 36, 38.

The central lighting arrangement as shown in FIG. 2 is particularly suited for a vehicle forward lighting application using light guides 32, 34 of the same diameter to deliver the same amount of light at the left and right headlamp positions for instance. In such an example, if the light source were a 40 Watt, metal halide arc discharge light source having an approximately 2.5 mm arc gap with approximately 3000 lumen output and the light guides were about 3 mm in diameter, each light guide 32, 34 would receive approximately 1000 lumens of light output even allowing for reflection losses. The area of the light guides 32, 34 having a 3 mm diameter would be about 7 square millimeters so that the light density in the light guides 32, 34 would be on the order of approximately 140 lumens per square millimeter which is quite appropriate for such an automotive application.

Figure 3:
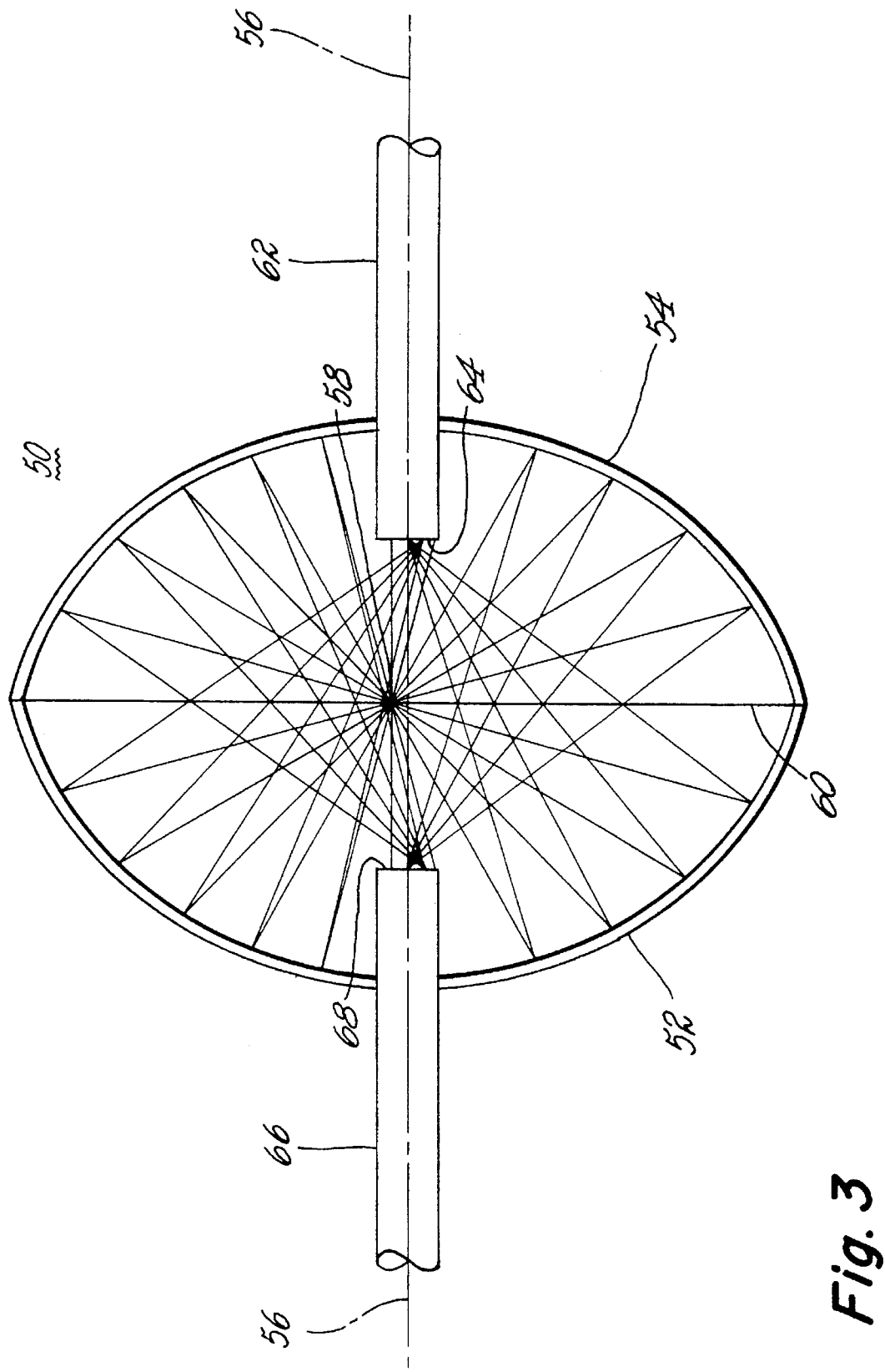
FIG. 3 is an elevational view in section of a central lighting system having a dual output and including a ray tracing of light collection and coupling characteristic thereof which is constructed in accordance with another embodiment of the invention.

Still another embodiment of a central lighting system 50 that is particularly suited for transmitting light to a number of remote locations from a single light source 12 is shown in FIG. 3 where, in addition to illustrating the components which make up such lighting arrangement 50, this figure illustrates a ray tracing of how the light output from the light source 12 will be collected by the reflector arrangement and coupled to the light guides. In this FIG. 3, a first ellipsoidal reflector 52 formed from a portion of an ellipsoid with minor axii, a=b=25 mm and major axis, c=25.6 mm has its opening coincident with that of another similar ellipsoidal reflector 54. Of course, these sizes are exemplary only and are not meant to limit the scope of the invention other than to indicate that the ratio of a,b to c for ellipsoidal reflectors which would operate in accordance with the present invention should be between about 102 and 108 percent. The distance from the center of such an ellipsoid to the foci for each reflector 52, 54 is given by the square root of major axis c squared minus minor axii a squared which results in a value of 5.6 mm. The light source 12 is placed transverse to a common optical axis 56 of the ellipsoidal reflectors 52, 54 and a common first focus 58 of both of such reflectors 52, 54. The openings of the ellipsoidal reflectors 52, 54 coincide with the plane 60 formed through the common first focus 58 of the ellipsoidal reflectors 52, 54, such plane 60 further being perpendicular to the optical axis 56. A first light guide 62 passes through the second ellipsoidal reflector 54 and has its input face 64 disposed at the second focus of the first ellipsoidal reflector 52. Similarly, a second light guide 66 passes through the first ellipsoidal reflector 52 and has its input face 68 disposed at the second focus of the second ellipsoidal reflector 54. The light rays shown in FIG. 3 are from a light source 12 having an arc gap of approximately 2.5 mm which would result in the light source extending about 1.25 mm on either side of the optical axis 56. As shown, the rays from the light source 12 all strike the respective input faces 64, 68 of the first and second light guides 62, 66. Using the above dimensions for the reflectors 52, 54 and the; light guides, the maximum angle at which the light rays strike the input faces 64, 68 is about 66 degrees from the normal to the surface. After refraction at the input face surface, this angle becomes 37 degrees within the light guide material which may have a refractive index of approximately 1.5 thereby resulting in total internal reflection as the light is transmitted through the light guides 62, 66.

Figure 4:
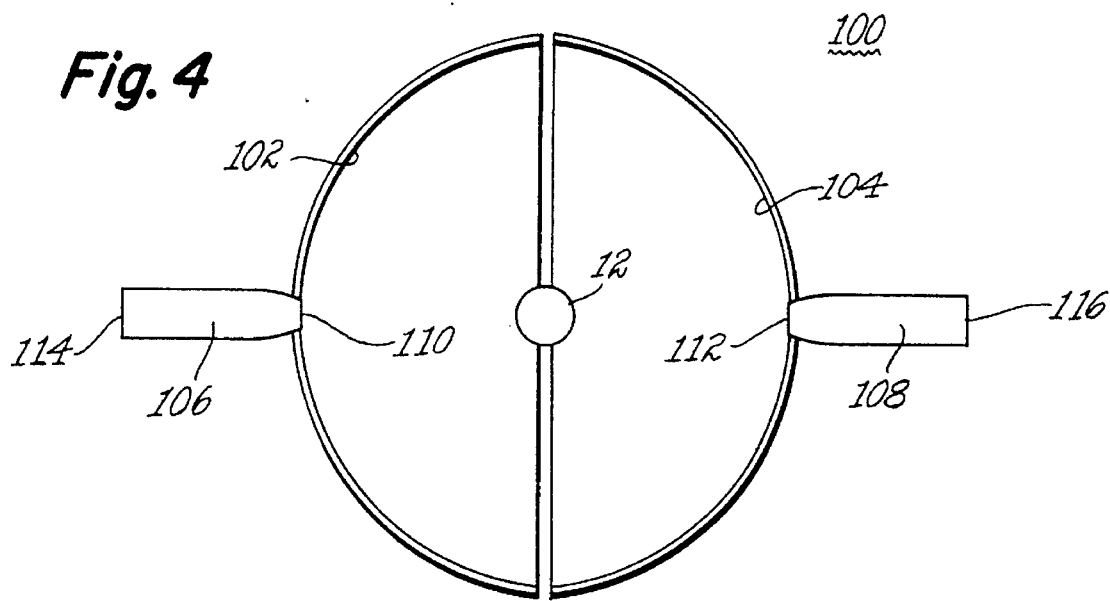
FIG. 4 is an elevational view in section of a central lighting system having a dual light output arrangement constructed in accordance with another embodiment: of the invention.
Figure 5:
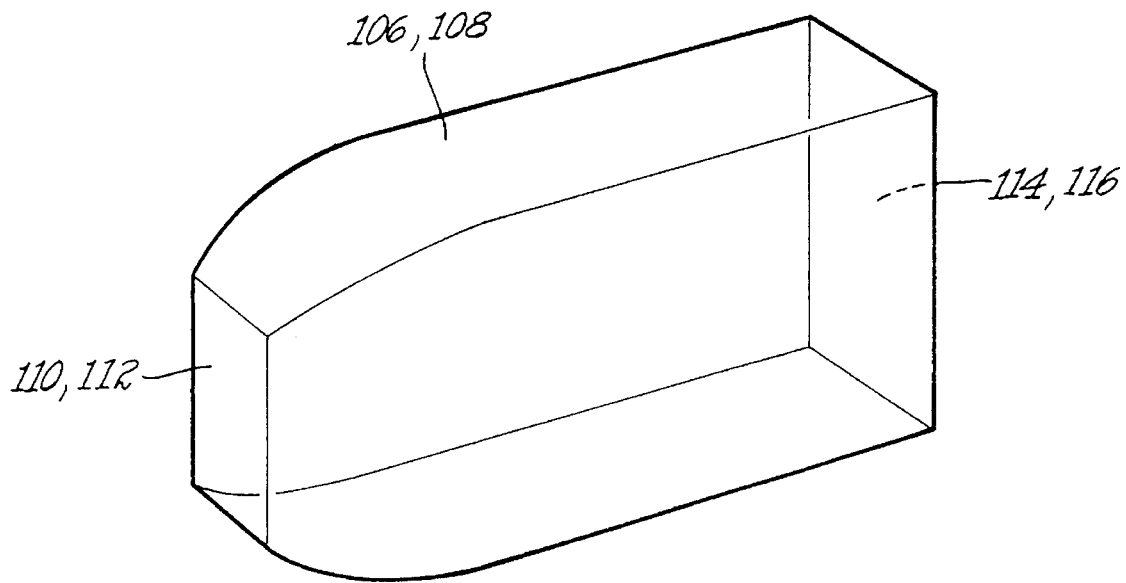
FIG. 5 is an isometric view in section of a light coupling member used in conjunction with the central lighting system as shown in FIG. 4.

FIG. 4 illustrates yet another example of a central lighting system 100 in which a light source 12 is disposed within a first and second ellipsoidal reflector 102, 104. Reflectors 102, 104 are of substantially the same dimensions and, when joined together at their respective openings, result in a light collection arrangement which surrounds the light source 12. In the embodiment illustrated in FIG. 4, the ellipsoidal reflectors 102, 104 are constructed so as to have an a,b to c ratio of approximately 1.06 which thereby allows that the second focus of each of the ellipsoidal reflectors 102, 104 will reside at the apex of its opposing counterpart reflector. By such a configuration, it has been measured that the peak collection angle for light which would enter the input faces of light guides as illustrated in FIGS. 1 through 3, would be on the order of approximately 53 degrees. At this high angle, light rays do not propagate through many optical fibers, particularly those having a numerical aperture rating of about 0.5. It can be appreciated that if a light guide having an NA rating of 0.65 were utilized, the 53 degree peak collection angle would be appropriate for allowing propagation of the light rays through such optical fiber. In such an instance, it is contemplated that the teachings presented herein relating to shapes and dimensions of the joined ellipsoidal reflectors 52, 54 which achieves the second optical focal point at the apex of the opposing counterpart reflector, would advantageously utilize the present invention. In a situation where an optical light guide is used having a lower NA rating, in order to avoid a significant light loss as would otherwise be caused by the inability to transmit light at the higher angles, it is therefore required to provide some way of conditioning the light rays before they are presented to the input face of such light guide. To solve this problem, the present invention provides for the use of respective first and second non-imaging optical coupling members 106 and 108 as shown in FIG. 4 and which are shown in detail in FIG. 5. The non-imaging optical coupling members 106, 108 are effective for performing an angle to area conversion such that lights rays entering the respective input faces 110, 112 at a large angle and over a small area can be converted to light rays at the output faces 114, 116 of the coupling members 106, 108 at smaller angles but over a larger area relative to that at the input faces 110, 112. In this manner, the light rays which appear at the output faces can be of a sufficiently small angle, such as 30 degrees for instance, so as to be efficiently coupled to one or more light guides optically coupled to the respective output faces 114, 116 of the first and second optical coupling members 106, 108. One way to perform this angle to area conversion is by use of the optical coupling device shown in FIG. 5 and which is configured in the form of a compound parabolic collector (CPC). It is also possible to perform the necessary angle to area conversion, using other shaped optical coupling devices such as a conical shaped device or a hyperbolically shaped device both of which are considered to be variations of the basic idea of performing the angle to area conversion in accordance with the principles of the present invention.

As discussed with respect to the central lighting systems of FIGS. 1 through 3, the system 100 shown in FIG. 4 is also effective when used in conjunction with either discharge light source or an incandescent light source. In either instance, measurements have been made and it has been found that the images of the source 12 which are formed at the foci are due to light which strikes near the apex of each of the ellipsoidal reflectors 102, 104 and is magnified by a factor of 2, whereas light which strikes near where the two ellipsoidal reflectors 102, 104 are joined, has a magnification ratio of near unity. For a light source 12 which is 3 mm by 1 mm; that is, a light source which is essentially oval shaped with the smaller dimension extending into the page of FIG. 4, it has been determined that 98 percent of the light rays are focussed in a 6 mm by 3 mm region. The peak angle at this point has been measured as 53 degrees with approximately 68 percent of the light falling at angles between 30 and 53 degrees thereby making it critical to collect such light in order to achieve a high coupling efficiency. Performing the angle to area conversion by use of the optical coupling members 106, 108, the output area becomes 9.6 mm by 4.8 mm. Using these values, it has been found that the present invention, using a Light Engine™ light source with a 4200 lumen output, can deliver an output in the range of greater than 3000 lumens for an efficiency in excess of 70 percent.

To further illustrate the benefits of the present invention, a comparison of the performance of the central lighting system 100 shown in FIG. 4 can be made with that of a system which uses a known elliptical reflector, as can be found for instance in commonly assigned U.S. patent application Ser. No. 07/860,388 filed on Feb. 21, 1991 in the name of Davenport et al. Using such a conventional reflector, measurements have been made indicating a collection efficiency of about 40 percent (2000 lumens transmitted from a 4200 lumen output light source) and an image magnification of about 4.2 thereby requiring a significantly larger light guide to couple into. With such an image magnification value, a 12.6 mm diameter optical fiber (approx. 125 mm squared area) would be needed whereas with the dual port arrangement as shown in FIG. 4, the sum of both areas of optical coupling members 106, 108 is on the order of about 92 mm squared which results in a brightness level of about 1.36 times that of the conventional reflector having a single port. In addition, the dual port arrangement of the present invention sees more of the light emitted from the light source 12 and thereby collects from 4 pi steradians compared to 1.4 pi steradians for a conventional reflector. This additional collection efficiency at high brightness is particularly advantageous for light sources that have more uniform luminous intensity profiles than the LE60 light source previously described.

Figure 6:
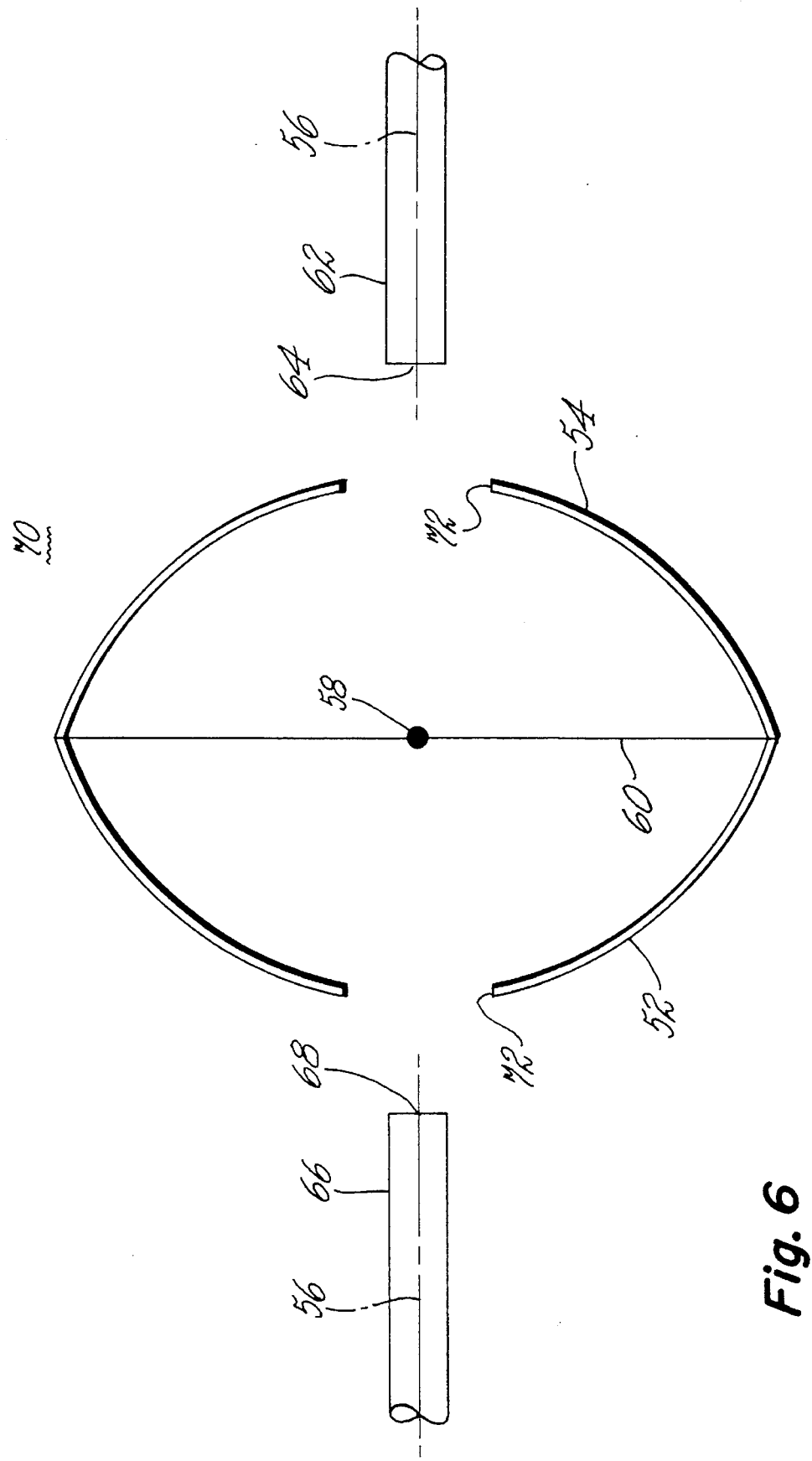
FIG. 6 is an elevational view in section of a central lighting system having a dual output and constructed in accordance with another alternate embodiment of the invention.

As seen in FIG. 6, another central lighting system 70 is illustrated using substantially the same components as illustrated in FIG. 3 yet allowing that the input faces 64, 68 of the light guides 62, 66 are disposed outside of the respective reflector members 52, 54. In such an arrangement, to insure maximum coupling efficiency, the openings 72 at the apex of the reflector members 52, 54 are enlarged as compared to that shown in FIG. 3. Additionally, the base to height ratios for the reflectors have been altered so as to allow for the second optical focal point to reside outside of the space occupied by reflectors 52, 54.

Although the hereinabove described embodiments constitute preferred embodiments of the invention, it can be understood that modifications can be made thereto without departing from the scope of the invention as set forth in the appended claims. For instance, it would be possible to configure the reflector assembly so as to achieve more than two reflector members and the associated optical coupling devices and still provide that the second optical focal point reside at the apex of opposing side reflector members. In such an instance, it would be possible to provide for more than two output ports. Additionally, although the optical coupling member 106 and 108 are shown having rectangularly shaped input face 110, 112, it is possible to provide an input face which is circular or has a smaller aspect ratio so as to be applicable with an incandescent light source.

We claim:

1. A light collection and distribution arrangement for coupling light output from a light source to at least one remote location comprising:

a first and a second light collector member disposed relative to one another in a joined manner so as to cooperatively surround the light source, each of said first and second light collector members having a first optical focal point associated therewith;

a light guide disposed partially within said first and second light collector members, said light guide having an input face disposed at the first optical focal point of one of said first and second light collector members;

wherein said one of said first and second light collector members having said first optical focal point at which said light guide input face is disposed, is an ellipsoidally shaped reflector member; and, wherein the other one of said first and second light collector members is an ellipsoidally shaped reflector and is joined to said one ellipsoidal reflector in an offset manner such that the light source can reside at one of said first optical focal points and said input face can reside at the other of said first optical focal points.

2. A light collection and distribution arrangement as set forth in claim 1 wherein such light output from the light source is introduced to said input face at a magnification level of approximately one.

\* \* \* \* \*